3,035,982
REPOSITORY VITAMIN $B_{12}$ GELATIN COMPOSITIONS AND PREPARATION THEREOF
Edward J. Hanus, Palisade, N.J., and Vincent J. Rizzo, Brooklyn, N.Y., assignors to Merck & Co., Inc., Rahway, N.J., a corporation of New Jersey
No Drawing. Filed Dec. 5, 1958, Ser. No. 778,307
8 Claims. (Cl. 167—81)

This invention relates to new vitamin $B_{12}$ compositions. More particularly, it is concerned with new vitamin $B_{12}$ compositions producing higher vitamin $B_{12}$ serum levels.

Vitamin $B_{12}$, which is also called cyanocobalamin, is known to be essential for erythrocyte maturation. Therapy with this vitamin is indicated in anemias resulting from its improper absorption and utilization. Thus, it is used in the treatment of pernicious anemia, a profound multiple system disorder caused by a tissue deficiency of vitamin $B_{12}$. This treatment involves the administration of vitamin $B_{12}$ parenterally by subcutaneous or intramuscular injection. For this purpose aqueous solutions of vitamin $B_{12}$ such as solutions of crystalline vitamin $B_{12}$ in isotonic sodium chloride solution have been generally used.

It is an object of the present invention to provide new vitamin $B_{12}$ containing compositions producing significantly higher blood levels of the vitamin for prolonged periods of time than was possible with the parenteral solutions heretofore available. Another object is to provide methods for the preparation of such compositions. Other objects will be apparent from the detailed description of our invention hereinafter provided.

In accordance with our invention, we have found that improved vitamin $B_{12}$ compositions suitable for parenteral administration are obtained by heating a solution of this vitamin in an aqueous gelatin solution. These new compositions provide a very desirable repository effect resulting in preparations exhibiting higher blood levels for longer periods of time than were heretofore obtainable.

These new vitamin $B_{12}$ compositions are prepared by heating the aqueous gelatin solutions containing vitamin $B_{12}$ at temperatures in excess of about 80° C. for sufficient time to produce the desired repository effect.

In general, we find that, although the concentration of the gelatin in the solution heated is not critical, it is desirable that the gelatin concentration be at least 5%. When aqueous solutions containing less than about 10% by weight of gelatin are heated with vitamin $B_{12}$, the resulting products exhibit only a slightly enhanced repository effect. Accordingly, pursuant to a preferred embodiment of our invention, the vitamin $B_{12}$ is heated with gelatin solutions having a gelatin content in excess of about 5%. Usually, we find most convenient to employ a gelatin solution containing between about 20–40% of gelatin since at these concentrations optimum results can be obtained depending upon the temperature and the time of heating.

The temperature at which the vitamin $B_{12}$ aqueous gelatin solutions can be heated to produce the desired compositions can vary between about 80 and 150° C.; longer periods of time being required at the lower temperatures and shorter periods at the higher temperatures. The optimum time for each temperature is readily ascertained by preparing samples and testing such samples for repository effect by the methods hereinafter described. Usually, we prefer to carry out the heating at a temperature of about 120° C. since at such temperatures the heating period can be shortened to about one hour. Also, the heating can be carried out in commercially available autoclaves which are usually designed to operate at temperatures of about 120° C.

As indicated above, the time of heating depends upon the temperature at which the heating is carried out. At a temperature of about 80° C. it is usually necessary to employ a heating period of about 16 hours or more, whereas at a temperature of about 120° C. a heating time of one hour is sufficient to produce a product having the desired repository effect.

The precise nature of the product obtained when the aqueous gelatin solution is heated with vitamin $B_{12}$ is not known. It is known, as will be shown later, that the product is not a mere admixture of vitamin $B_{12}$ and heated gelatin, since such admixtures do not possess the desired repository effect. During the process of heating vitamin $B_{12}$ with the gelatin solutions a portion of the vitamin is bound, possibly in the form of a complex, since dialysis of the product shows the presence of some of the cobalamin activity in non-dialyzable form. The amount of such non-dialyzable vitamin $B_{12}$ is found to vary between about 15 and 35% depending upon the temperature and the time of heating. The presence of this non-dialyzable cobalamin is a characteristic property of our new compositions and distinguishes our product from simple admixtures of vitamin $B_{12}$ in aqueous gelatin.

The following example showing the preparation of an improved repository vitamin $B_{12}$ composition is illustrative of methods of preparing such compositions.

EXAMPLE

To 3000 cc. of freshly distilled water heated to about 60–65° C. was added 6 g. of vitamin $B_{12}$ and 1,000 g. of Type A non pyrogenic, now antigenic gelatin. The resulting solution was stirred until the gelatin was completely dissolved, and sufficient 10% aqueous sodium carbonate solution added to bring the solution to a pH of 4.5. The solution was then transferred to a bottle, sealed with a rubber stopper containing a cotton vent and placed in an autoclave for 4 hours at 121° C. The autoclaved solution was filtered through a filter press fitted with No. 2 asbestos pads. The filter press was washed with 1,000 cc. of sterile distilled water and the washes added to the filtrate. Finally 45 g. of benzyl alcohol and sufficient sterile distilled water was added to make the final volume 5,000 cc.

The solution was then stirred until homogeneous and subdivided into 10 cc. sterile vials which were then sterilized by autoclaving for about ½ hour at 121° C.

Vitamin $B_{12}$ compositions prepared in this manner produce significantly higher blood levels than can be obtained by merely dissolving vitamin $B_{12}$ in isotonic sodium chloride solutions or in unheated aqueous gelatin solutions. Thus, the repository effect of our new compositions was demonstrated by experiments in dogs. In this study the repository effect of the following preparations was studied:

(1) A solution containing 1 mgm. per ml. of vitamin $B_{12}$ heated for two hours in a 20% gelatin solution in water.

(2) A solution containing 1 mgm. per ml. of vitamin $B_{12}$ heated for four hours at 120° C. in a 20% gelatin in water solution.

(3) A solution containing 1 mgm. per ml. of vitamin $B_{12}$ added to a 20% gelatin in water solution previously heated at 120° C. for two hours.

(4) A solution containing 1 mgm. per ml. of vitamin $B_{12}$ added to a 20% gelatin in water solution previously heated at 120° C. for four hours.

(5) An aqueous solution containing 1 mgm. per ml. of vitamin $B_{12}$ in water.

In the study the dogs were injected intramuscularly with 0.5 ml. of each preparation (representing 500 micrograms of vitamin $B_{12}$). Venous blood was drawn before the injection of the vitamin $B_{12}$ solution and at 2, 5, 24, and 48 hour intervals after administration of the vitamin solution. The serum levels of vitamin $B_{12}$ were determined in accordance with standard procedures with *L. leichmanii*. The results of this study are shown in Table I.

aqueous solution of the vitamin $B_{12}$ served as a control. In carrying out these tests 0.5 ml. of the composition tested was injected into the gluteal muscle of each of two dogs. The figures in Table III are the millimicrograms per ml. of vitamin $B_{12}$ in the blood at the indicated intervals.

*Table I*

| Product | Serum Levels of Vitamin $B_{12}$, millimicrograms per ml. | | | | | | | | | | | | | | |
|---|---|---|---|---|---|---|---|---|---|---|---|---|---|---|---|
| | 1 mg./ml. Vit. $B_{12}$ heated 2 hours, 20% gelatin | | | 1 mg./ml. Vit. $B_{12}$ heated 4 hours, 20% gelatin | | | 1 mg./ml. Vit. $B_{12}$ added to 20% gelatin heated 2 hours | | | 1 mg./ml. Vit. $B_{12}$ added to 20% gelatin heated 4 hours | | | Aqueous solution, 1 mg./ml. Vit. $B_{12}$ | | |
| Dog No. | 1 | 2 | Ave. | 3 | 4 | Ave. | 5 | 6 | Ave. | 7 | 8 | Ave. | 9 | 10 | Ave. |
| Hrs. after administration: | | | | | | | | | | | | | | | |
| 0 | 0.49 | 0.56 | 0.52 | 1.26 | 0.80 | 1.03 | 1.05 | 0.76 | 0.90 | 0.81 | 0.05 | 0.40 | 0.62 | 0.55 | 0.59 |
| 2 | 41.2 | 27.4 | 34.3 | 72.7 | 95.7 | 84.2 | 105.7 | 56.2 | 80.9 | 67.6 | 85.0 | 76.3 | 44.8 | 42.0 | 43.4 |
| 5 | 8.79 | 5.34 | 7.07 | 25.4 | 11.5 | 18.5 | 6.47 | 2.88 | 4.68 | 5.22 | 3.38 | 4.30 | 3.01 | 5.99 | 4.50 |
| 24 | 1.76 | 1.17 | 1.47 | 3.61 | 1.98 | 2.79 | 1.19 | 1.14 | 1.17 | 1.41 | 0.82 | 1.12 | 0.85 | 0.87 | 0.86 |
| 48 | 1.67 | 1.47 | 1.57 | 3.27 | 1.67 | 2.47 | 1.12 | 1.08 | 1.10 | 0.64 | 0.54 | 0.58 | 0.69 | 0.73 | 0.71 |

The results of this series of tests indicates clearly that a significantly higher blood level of vitamin $B_{12}$ was obtained in each instance when the vitamin $B_{12}$ was heated with the 20% gelatin solution. Further, these results show that the desired effects are not obtained by a mere admixture of the vitamin $B_{12}$ and heat treated gelatin solutions.

Table II below shows that the repository activity is produced when a 20% aqueous gelatin solution is heated with vitamin $B_{12}$ at 80° C.

*Table II*

| Hours After Administration | Vitamin $B_{12}$—millimicrograms per ml. serum | | |
|---|---|---|---|
| | Vitamin $B_{12}$ Heated in 20% Gelatin at 80° C. for 16 hours | Vitamin $B_{12}$ Heated in 20% Gelatin at 80° C. for 32 hours | Vitamin $B_{12}$ in Aqueous Solution (Control) |
| 0 | 0.277 | 0.250 | 0.316 |
| 5 | 15.7 | 13.3 | 5.02 |
| 24 | 2.49 | 1.89 | 1.50 |
| 48 | 1.49 | 1.29 | 0.733 |

In this experiment, the three preparations each contained 1 mg./ml. of vitamin $B_{12}$. Each of the three preparations was tested by injecting 0.5 ml. into the gluteal muscle of two dogs. The results shown in Table II are the average serum levels in millimicrograms per ml. of the vitamin $B_{12}$ in the blood samples drawn at the indicated intervals.

The results of these tests indicate that repository activity is produced by heating the aqueous gelatin solution with vitamin $B_{12}$ at 80° C.

In another study in dogs the effect of varying the gelatin concentration upon repository activity was studied. The results of this study are set forth in Table III.

*Table III*

| Hours After Administration | Serum Level of Vitamin $B_{12}$—Millimicrograms/ml. | | | | |
|---|---|---|---|---|---|
| | 1% Gelatin Vehicle | 5% Gelatin Vehicle | 10% Gelatin Vehicle | 20% Gelatin Vehicle | Aqueous Vehicle (Control) |
| 0 | 0.46 | 0.42 | 0.31 | 0.36 | 0.46 |
| 5 | 3.81 | 4.28 | 7.30 | 14.66 | 3.36 |
| 24 | 2.42 | 1.59 | 1.70 | 2.55 | 1.80 |
| 48 | 1.19 | 1.47 | 2.24 | 2.00 | 1.25 |

All of the gelatin preparations shown in Table III were prepared by heating the gelatin solutions containing 1 mg./ml. of vitamin $B_{12}$ for 4½ hours at 121° C. An The results shown in Table III indicate that the products containing less than about 5% of gelatin have little or no repository activity while the preparation containing 20% gelatin had the highest repository activity.

The effect of the concentration of vitamin $B_{12}$ in the gelatin vehicle is shown in Table IV below.

*Table IV*

| Amount of $B_{12}$ (Micrograms/ml.) | Vitamin $B_{12}$—millimicrograms per ml. of Serum | | | | | | |
|---|---|---|---|---|---|---|---|
| | 250 | 250 | 500 | 500 | 750 | 750 | 1,000 |
| Vehicle | Water | 20% Gelatin | Water | 20% Gelatin | Water | 20% Gelatin | Water |
| 0 hrs. | .209 | .284 | .265 | 0.293 | 0.222 | 0.300 | 0.304 |
| 5 hrs. | 1.15 | 2.40 | 1.47 | 4.62 | 4.02 | 9.67 | 3.98 |
| 24 hrs. | 1.27 | 1.24 | 1.23 | 1.97 | 1.11 | 2.93 | 0.953 |
| 48 hrs. | 0.616 | 0.388 | 0.543 | 0.695 | 0.565 | 1.75 | 0.672 |

These tests were carried out in the same manner as the above-described tests. The gelatin containing preparations were prepared by heating a 20% aqueous gelatin solution containing the indicated amounts of vitamin $B_{12}$ for 4 hours at 121° C. In these tests 0.5 ml. of each preparation was injected into the gluteal muscle of each of two dogs. The figures in the table show the concentration of vitamin $B_{12}$ in the serum (blood) at the intervals indicated.

The results of the study shown in Table IV indicate that the repository effect of the gelatin preparation containing 250 micrograms per ml. was not marked. However, at concentrations of 500 micrograms and 750 micrograms the gelatin preparations clearly exhibited repository activity not exhibited by the corresponding aqueous preparations.

The new aqueous gelatin-vitamin $B_{12}$ solutions obtained in accordance with our invention possess a number of advantages over the known vitamin $B_{12}$ preparations used for parenteral injection. As shown above, these new compositions possess repository activity and the depletion of the vitamin $B_{12}$ from the site of injection is much slower than with other vitamin $B_{12}$ preparations. In addition, the new gelatin preparations produce a higher hepatic uptake and give prolonged effect in the blood. Further, the slower rate of depletion results in less spillage of vitamin $B_{12}$ in the urine.

Various changes and modifications may be made in carrying out the present invention without departing from the spirit and scope thereof. Insofar as these changes and modifications are within the purview of the annexed claims, they are to be considered as part of our invention.

What is claimed is:

1. In the process of preparing improved vitamin $B_{12}$ compositions in aqueous gelatin suitable for parenteral administration, the improvement which comprises heating an aqueous gelatin solution of vitamin $B_{12}$ containing at least 5% gelatin for at least one hour at a temperature between 80 and 150° C.

2. The process according to claim 1 wherein the heating is carried out at about 120° C. for two hours.

3. The process according to claim 1 wherein the heating is carried out at about 120° C. for four hours.

4. Improved vitamin $B_{12}$ compositions suitable for parenteral administration comprising an aqueous gelatin solution of vitamin $B_{12}$ prepared by heating an aqueous gelatin solution containing at least 5% gelatin with vitamin $B_{12}$ for at least one hour at a temperature between 80 and 150° C.

5. The product of claim 4 wherein the heating is carried out at 120° C.

6. The product of claim 4 wherein the heating is carried out at 120° C. for about four hours.

7. The product of claim 4 wherein the vitamin $B_{12}$ composition is prepared by heating an aqueous solution containing about 25% gelatin and vitamin $B_{12}$ at 120° C. for about four hours.

8. The improved vitamin $B_{12}$ compositions of claim 4 wherein at least 15% of the vitamin $B_{12}$ activity is in combination with the gelatin in a non-dialyzable form.

References Cited in the file of this patent

Gakenheimer: Drug and Cosmetic Industry, vol. 72, No. 3, March 1953, pp. 320 and 321.